UNITED STATES PATENT OFFICE.

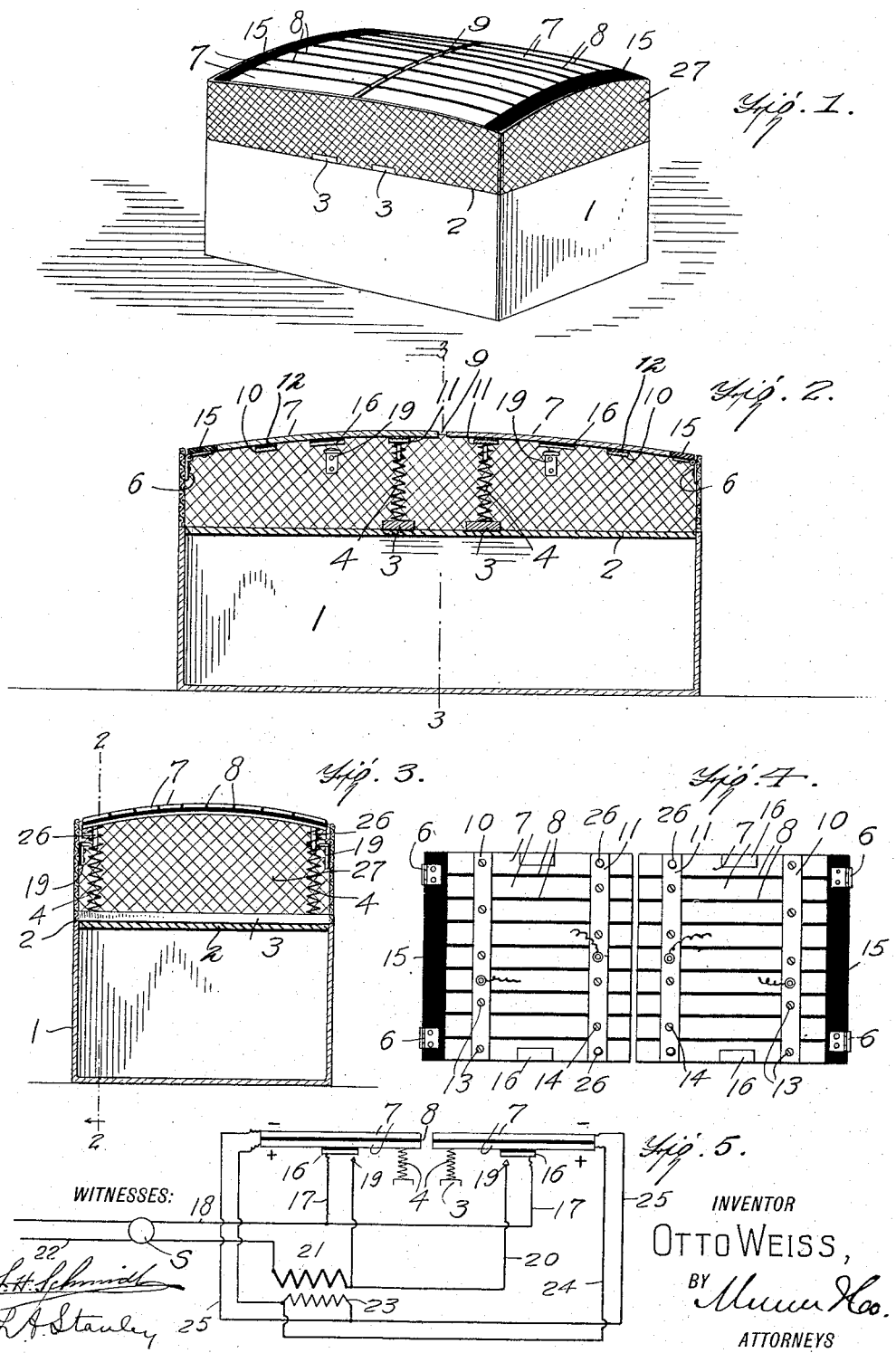

OTTO WEISS, OF SALT LAKE CITY, UTAH, ASSIGNOR OF ONE-HALF TO WILLIAM SUNDAY, OF SALT LAKE CITY, UTAH.

ELECTRIC RAT AND ANIMAL TRAP.

1,170,946. Specification of Letters Patent. Patented Feb. 8, 1916.

Application filed April 14, 1914. Serial No. 831,874.

*To all whom it may concern:*

Be it known that I, OTTO WEISS, a former subject of the Emperor of Germany, but now have declared my intention of becoming a citizen of the United States of America, residing in Salt Lake City, in the county of Salt Lake and State of Utah, have invented a certain new and useful Improvement in Electric Rat and Animal Traps, of which the following is a specification.

My invention relates to improvements in traps for electrocuting animals such as rats, mice, and the like, and it consists in the combinations, constructions, and arrangements herein described and claimed.

An object of my invention is to provide a device of the type described having a hinged portion which will move under the weight of the rat or other animal so as to connect the primary of an induction coil or transformer, the movable part being so constructed that the animal will come in contact with oppositely charged portions connected up with the secondary in such a manner that death will result.

A further object of my invention is to provide a device having a curved platform so that when the animal is killed it will roll off, thereby permitting the platform to move so as to break the circuit and to control the current.

A further object of my invention is to provide a trap which is operated by electricity and which is comparatively simple in construction and therefore not easily liable to get out of order.

Other objects and advantages will appear in the following specification, and the novel features of the invention will be particularly pointed out in the appended claims.

My invention is illustrated in the accompanying drawings, forming part of this application, and in which—

Figure 1 is a perspective view of the device; Fig. 2 is a longitudinal section therethrough, the electrical connections being omitted for the sake of clearness; Fig. 3 is a transverse section therethrough, the electrical connections being omitted for the sake of clearness; Fig. 4 is a bottom plan view of the platforms and Fig. 5 is a diagrammatic view of the electric circuit.

In carrying out my invention I provide an outer casing 1 of any suitable shape. This casing is preferably provided with a partition 2 which serves as a support for a pair of transverse members 3, the latter bearing at their ends vertically extending springs 4.

Hinged at 6 to the upper end of the casing, is a pair of platforms. Each of these platforms consists of a series of parallel longitudinal conducting members 7 spaced apart by insulating material 8. As will be seen from the drawings, the two platforms are spaced apart as shown at 9.

The two platforms are precisely alike. Adjacent conducting strips 7 are connected to the opposite ends of the secondary of a transformer, while alternate conducting sections 7 are connected to a common terminal. This may be accomplished in a number of different ways. In Fig. 4 I have shown two conducting strips 10 and 11 which are suitably insulated from the conducting strips 7 by insulating material 12. Conducting pins or screws 13 connect the alternate sections, while similar pins 14 passing through the strip 11, connect the remaining sections. Each platform has an end member 15 of non-conducting material to which the hinges 6 are attached.

On the bottoms of the platforms are secured conducting plates 16 which are suitably insulated from the strips 7. The latter are connected by means of conductors 17 to the lead wire 18.

Arranged to coöperate with the conducting contact plate 16 are contacts 19 which are preferably secured to the sides of the casing 1 directly underneath the contact 16. The contacts 19 are connected by means of the conductor 20 with the primary 21 of a transformer, the primary being connected with one of the lead wires 22 as shown in Fig. 5. The secondary 23 of the transformer is connected by the conductor 24 with a binding post connected with one of the sets of conducting members 7. The opposite end of the secondary is connected by conductor 25 with a binding post connected with the remaining conductors 7 so that adjacent conductors 7 are connected to the high voltage secondary.

The springs 4 bear on the under sides of the platforms, which are preferably provided with guide members extending downwardly through the centers of the springs as shown. These springs tend to keep the platforms in a slightly raised position. They are designed to be merely far enough so as to separate the contacts 19 and 16.

From the foregoing description of the various parts of the device, the operation thereof may be readily understood. The shelf 2 may be used as a bait shelf, and bait to attract the rats or mice may be placed thereon. A wire netting 27 may be placed around the upper part of the device, so as to prevent the rat from getting the bait directly. The moment he jumps on the platform the latter will descend under his weight and will connect the primary circuit of the transformer through the engagement of the contacts 16 and 19. If the switch S in the primary circuit, see Fig. 5 has been turned so as to supply current to the transformer, the circuit will be closed when either of the platforms descend. This will energize the secondary which will thereupon electrocute the animal as soon as any two parts of the body come in contact with oppositely charged conducting member 7. As soon as the animal drops, he will roll off owing to the curvature of the platform, which it will be observed, is great enough to cause the body to roll off while not being too great to prevent the animal from easily walking over the surface. When the platform is relieved of the weight of the body of the animal, the springs 4 will immediately raise the platform so as to break the circuit of the primary transformer at 16—19. There is, therefore, no waste of current, and it can be easily seen that the device can be run at a very small expense since the current is used only when it is needed.

Obviously instead of a transformer, a battery and induction coil might be used. It is also obvious that various changes might be made without departing from the spirit and scope of the invention.

Where the device is to be used in a house where there are children, I may use a wire covering for the top having holes large enough for the animal to enter, said wire top serving as a protection against any one accidentally coming in contact with the conducting bar 7.

I claim:

1. In an electric trap, a casing, a plurality of platforms hinged at one end to said casing, each of said platforms being composed of a series of conducting sections suitably insulated from one another, means for electrically connecting the alternate sections together, spring means for normally holding the platforms in an upper position, the weight of an animal on the platform causing the latter to descend, a primary source of current, a switch operated by the descending movement of either of said platforms for completing the circuit through the primary source of current, a secondary source of current associated with the primary, connections between one terminal of said secondary source of current and certain of said conducting bars, and connections at the opposite end of said secondary source of current with the remaining bars.

2. In an electric trap, a casing, a plurality of platforms hinged at one end to said casing, each of said platforms being curved toward its outer edges and being composed of a series of conducting sections suitably insulated from one another, means for electrically connecting the alternate sections together, spring means for normally holding the platform in an upper position, the weight of the animal on the platform causing the latter to descend, a primary source of current, a switch operated by the descending movement of either of the said platforms for completing the circuit through the primary source of current, a secondary source of current associated with the primary, connections between one terminal of said secondary source of current at certain of said conducting bars and connections at the opposite end of said secondary source of current with the remaining bars.

OTTO WEISS.

Witnesses:
F. STULTZ,
L. J. LAMMERS.